United States Patent
Elsaesser et al.

(10) Patent No.: US 8,577,865 B2
(45) Date of Patent: Nov. 5, 2013

(54) DOCUMENT SEARCHING SYSTEM

(75) Inventors: Thomas Elsaesser, Hockenheim (DE); Liane Engel, Mannheim (DE)

(73) Assignee: SAP AG, Walldorf (DE)

(*) Notice: Subject to any disclaimer, the term of this patent is extended or adjusted under 35 U.S.C. 154(b) by 1535 days.

(21) Appl. No.: 11/168,551

(22) Filed: Jun. 28, 2005

(65) Prior Publication Data
US 2006/0080295 A1    Apr. 13, 2006

(30) Foreign Application Priority Data
Sep. 29, 2004    (EP) .................... 04023112

(51) Int. Cl.
G06F 17/30    (2006.01)
(52) U.S. Cl.
USPC ........... 707/707; 707/723; 707/731; 707/748; 707/752
(58) Field of Classification Search
USPC .......... 707/3, 2, 4, 5, 707, 723, 731, 748, 752
See application file for complete search history.

(56) References Cited

U.S. PATENT DOCUMENTS

| | | | |
|---|---|---|---|
| 6,438,539 B1 | 8/2002 | Korolev et al. | |
| 6,546,388 B1* | 4/2003 | Edlund et al. | 707/5 |
| 7,054,859 B2* | 5/2006 | Kuno et al. | 707/5 |
| 7,165,119 B2* | 1/2007 | Fish | 709/246 |
| 7,472,113 B1* | 12/2008 | Watson et al. | 707/3 |
| 2002/0099685 A1* | 7/2002 | Takano et al. | 707/1 |
| 2003/0195877 A1* | 10/2003 | Ford et al. | 707/3 |
| 2004/0024745 A1* | 2/2004 | Jeng et al. | 707/2 |

OTHER PUBLICATIONS

Andrade et al., "Multiple query optimization for data analysis applications on clusters of SMPs," *Proceedings of the 2nd IEEE/ACM International Symposium on Cluster Computing and the Grid (CCGRID202)*, Berlin, Germany, May 21-24, 2002, pp. 154-162.
Brunelli and Mich, "Query simplification and strategy selection image retrieval," *Proceedings 15th International Conference on Pattern Recognition*, Sep. 3-7, 2000, Los Alamitos, CA, 4: 279-282.
Croft and Thompson, "The use of adaptive mechanisms for selection of search strategies in document retrieval systems," *Proceedings of the Joint BCS and ACM Symposium*, Cambridge, UK, 1984, pp. 95-110.
Karnaugh; "A new toolkit for non-admissible Heuristic search," *Proceedings of the conference on artificial intelligence application*, Santa Barbara, CA, Mar. 5-9, 1990, 1(6): 162-168.
Roy et al., "Efficient and extensible algorithms for multi query optimization," *ACM SIGMOD International Conference on Management of Data*, Dallas, TX 2000, pp. 249-260.
Tombros et al., "The effectiveness of query-specific hierarchic clustering in information retrieval," *Information Processing & Management*, 2002, 38(4): 559-582.

* cited by examiner

*Primary Examiner* — Etienne Leroux
*Assistant Examiner* — Cindy Nguyen
(74) *Attorney, Agent, or Firm* — Schwegman Lundberg & Woessner, P.A.

(57) ABSTRACT

Searching for documents using different sources includes receiving a search statement containing information for the documents, and determining a search strategy based on the search statement. The search strategy includes first and second search activities for searching first and second sources, respectively, where the first and second search activities are weighted. The first and second sources are searched using the first and second search activities, respectively, where an order in which the first and second search activities are performed is dictated by weightings of the first and second search activities.

18 Claims, 6 Drawing Sheets

Doc1

| Document meta-data | 204 |
|---|---|
| Document content | 302 |

Doc2

| Document meta-data | 204 |
|---|---|
| Document content | 302 |

Doc3

| Document meta-data | 204 |
|---|---|
| Document content | 302 |

DOCUMENT SEARCHING SYSTEM

CLAIM TO PRIORITY

The application claims priority to European Patent Application No. EP04023112.8, filed on Sep. 29, 2004, the contents of which are hereby incorporated by reference into this application as if set forth herein in full.

TECHNICAL FIELD

This patent application relates, in general, to searching for documents and, more particularly, to using a dynamic searching strategy to conduct a search.

BACKGROUND

In relational databases, searches are performed using search queries. Search queries can include any kind of strings. A "JOIN" statement may be used to combine two or more searches of a database. One drawback of such searching is that it cannot be used to search for distributed content, meaning content that is stored in different locations, such as different databases or different database tables having different key fields.

Another known searching method is to perform a search for a specified search string in different databases or tables according to a predefined strategy. Such searches are performed independently, and results thereof may be combined. For instance, when searching for a particular string in a distributed document, a full-text database may be searched. Then, a classification table may be searched, followed by an object link table. The partial search results may then be combined to provide a search result.

Figure 5:
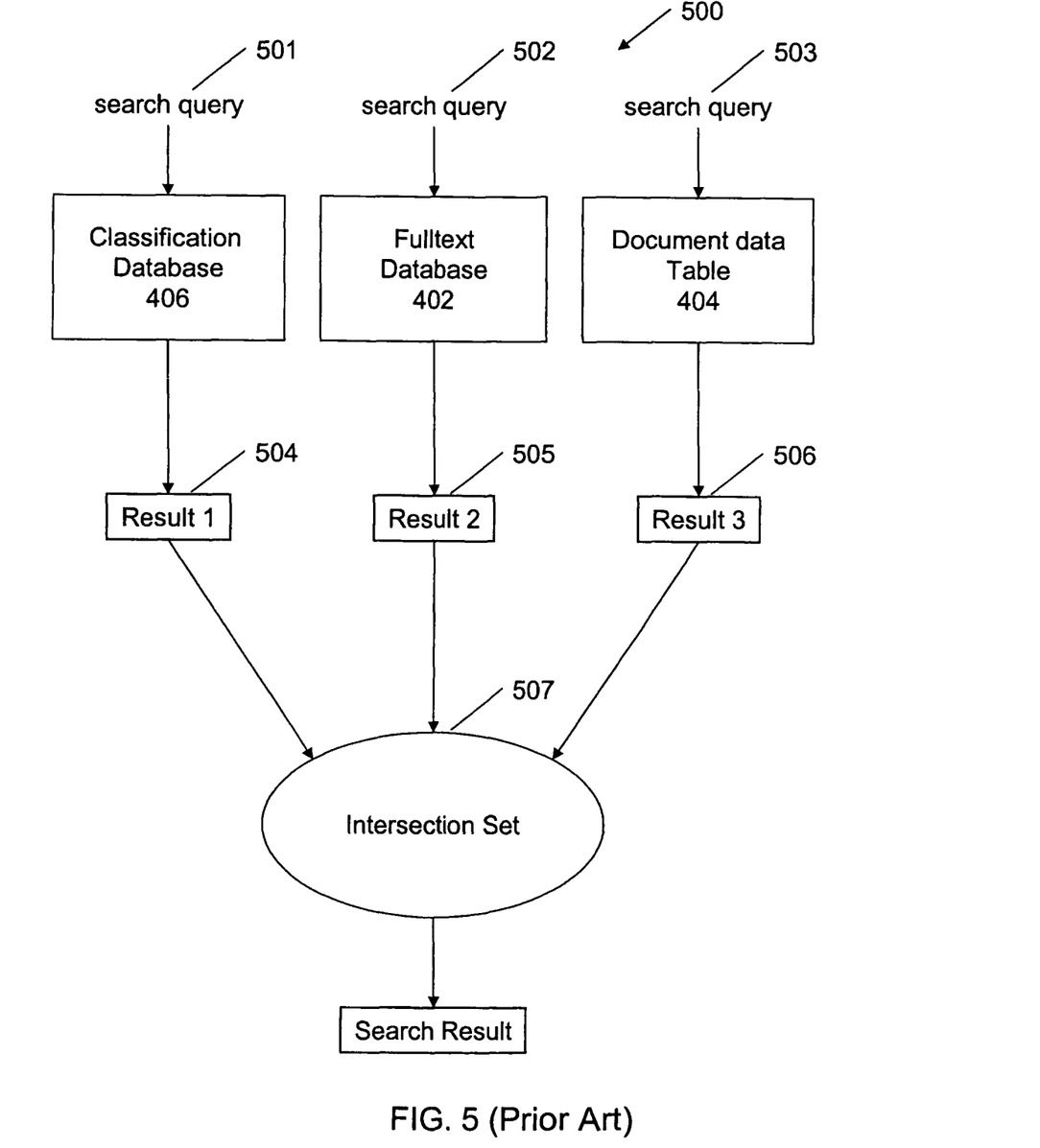
FIG. 5 illustrates a prior art searching system.

FIG. 5 illustrates how searching may be performed using the foregoing method. In system 500, a user enters search queries 501, 502 and 503. Each search query is used by system 500 to perform searches in a different source 402, 404 and 406. Searching in each of sources 402, 404 and 406 produces the following search results: result1 504, result2 505 and result3 506. Search results 504, 505 and 506 are combined as intersection set 507 (e.g., search results 504, 505 and 506 may be logically "ANDed" or "ORed"). Thereafter, a final search result is output. System 500 requires extensive searching because each source is fully searched, i.e., no documents are excluded even if they fail to meet other criteria. Such searching can be relatively processing intensive and, as a result, relatively slow.

SUMMARY

This patent application describes methods and apparatus, including computer program products, for performing document searches.

In general, in one aspect, the invention is directed to searching for documents using different sources, and includes receiving a search statement containing information for the documents, and determining a search strategy based on the search statement. The search strategy includes first and second search activities for searching first and second sources, respectively, where the first and second search activities are weighted. The first and second sources are searched using the first and second search activities, respectively, where an order in which the first and second search activities are performed is dictated by weightings of the first and second search activities. This aspect may also include the following.

The search statement may be a search query and a search parameter. The search query may include a string and the search parameter may correspond to a source to be searched for the string. The weightings of the first and second search activities may be based, at least in part, on the search query and the search parameter.

Searching may include performing the first search activity to identify a first set of documents, and performing the second search activity using the first set of documents. The second search activity may be performed to identify a second set of documents, where the second set of documents may be a subset of the first set of documents. A third search activity may be performed for searching a third source. The third search activity may be part of the search strategy, and may use the second set of documents.

Performing the second search activity using the first set of documents may include performing the second search activity for information relating to the second set of documents. A result may be provided, which is obtained by searching the first and second sources using the first and second search activities, respectively. The result may identify documents that comport with the search statement. At least one of the first and second sources may include at least one of a table and a database.

The weightings may be based, at least in part, on a specificity of the search statement. The specificity may be defined in accordance with one of a number of characters in a part of the search statement and whether the search statement contains a wildcard character. The documents may stored in different locations that are accessible over a network. An input engine, an evaluation engine, a determination engine, and a search engine may be used in an overall process that includes the searching.

The details of one or more examples are set forth in the accompanying drawings and the description below. Further features, aspects, and advantages of the invention will become apparent from the description, the drawings, and the claims.

DETAILED DESCRIPTION

Figure 1:
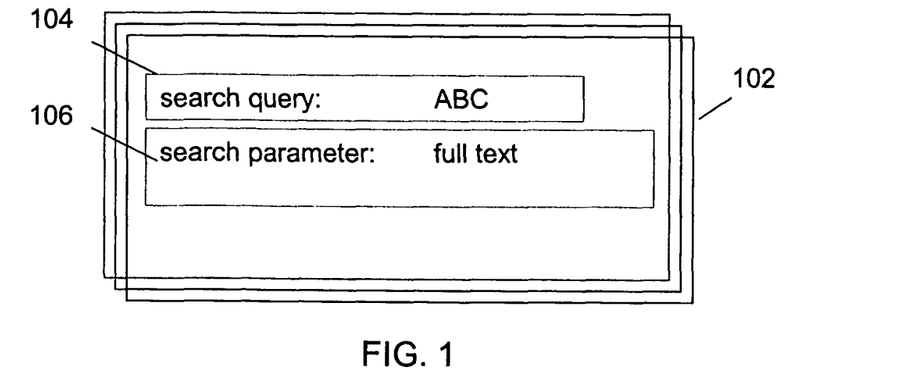
FIG. 1 illustrates an example of a search statement.

FIG. 1 illustrates a search statement 102. Search statement 102 includes search query 104 and search parameter 106. The search query contains information for which a search is conducted. In this implementation, search query 104 can be any type of character or number string, such as "ABC". Search parameter 106, in this implementation, is organizational information that corresponds to the type of information to be searched. By way of example, in FIG. 1, the type of information is "full-text", meaning the entire text of one or more documents. Thus, in the example of FIG. 1, the full-text of documents in a pre-selected database is to be searched for the character string "ABC". Any documents containing this character string are identified as a result of the search.

Searches may be based on text within documents or on metadata stored with or in the documents. Metadata may contain information identifying the document, such as a version identifier that identifies the version of a document, and information specifying characteristics of a document, such as whether a document is marked for deletion. Search parameters may be based on metadata and/or document text.

Figure 2:
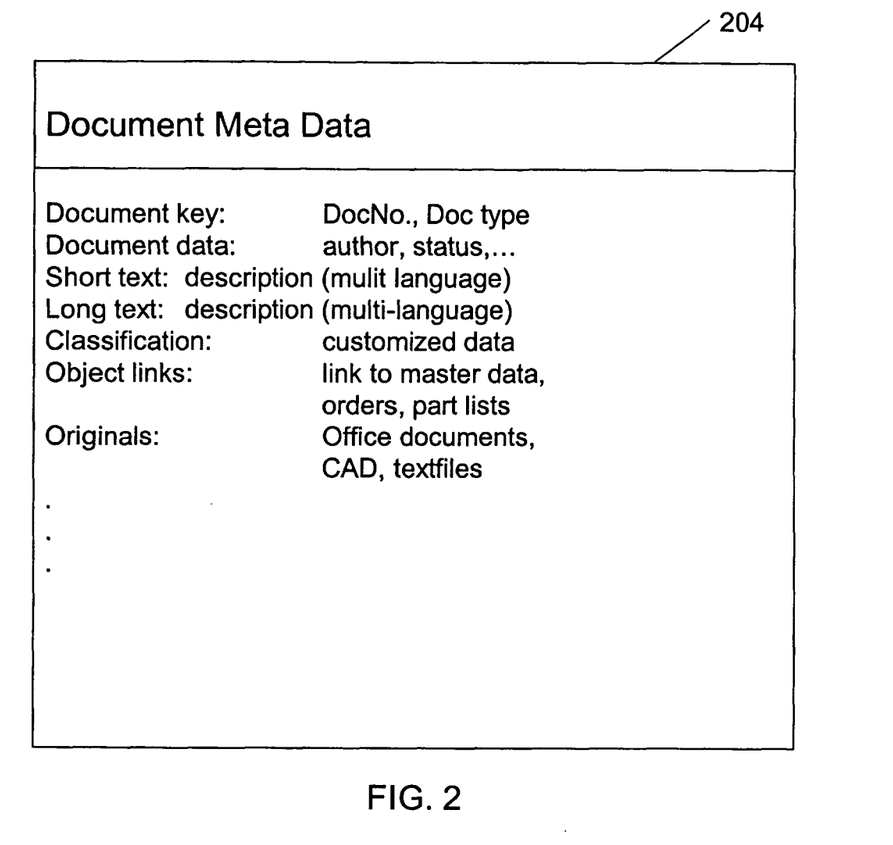
FIG. 2 illustrates an example of document metadata.

FIG. 2 shows document metadata 204. Different types of documents may have different types of metadata. In FIG. 2, the metadata includes a document key, document data, short text, long text, classification, object links, and originals. Document key identifies a document using a document number, a document type, or the like. Document data identifies the author of a document, a status of the document, its creation time, its last edit time, or the like. Short text includes a description of the document, such as an abstract or summary, and can be in multiple languages. Long text includes a more explicit description of the document, and can also be in multiple languages. Classification specifies a document classification, which can be tailored for customers needs. For example, a document can be classified as a report, a specification, a communication, or the like. Object links can include descriptions of links in the document to one or more other objects. For example, a document can link to master data, a part lists, orders, or any other type of business objects. Originals can include a description of the origin of the document. Any other type of metadata may also be included including, but not limited to, document version, partial document, deletion tag, computer-aided design (CAD) tag, professional worker, revision number, access group, lab, design unit, etc., some of which are described below.

Document searches may be based on the foregoing metadata. For example, search parameters that may be used in search statement 102 include, but are not limited to: (a) document type, which enables searching by document type; (b) document number, which enables searching by document number; (c) document version, which enables searching by version identifier; (d) partial document, which enables searching through only a specified part of one or more documents; (e) deletion tag, which enables searching for one or more documents having a deletion tag, where a deletion tag is some indication as to whether the document is to be deleted; (f) CAD tag, which enables searching for one or more documents having a CAD tag, where a CAD tag is some indication that the document was generated using a CAD system; (g) a professional worker identifier, which enables searching for one or more documents created or revised by a particular type of, or individual, professional worker; (h) access group, which enables searching for one or more documents to which one or more groups have specified access rights, such as "open", "read", "edit", or the like; (i) revision number, which enables searching by revision number, where a revision number can also be indicative of status, such as where a document is in a revision cycle; (j) laboratory or design unit, which enables searching for documents created or revised by a professional in a laboratory or design unit; (k) document state, which enables searching for one or more documents having a specified state at a particular moment in time; (l) short text, which enables searching for one or more documents that have, or that do not have, a specified string or strings in its document short text, where "short text" can mean an abstract or summary of a document; (m) long text, which enables searching for one or more documents that have, or that do not have, a specified string or strings in its document long text, where "long text" can mean an extended portion from a document's short text up to, and including, its full-text; (n) data carrier, which enables searching for one or more documents that are stored on a specified data carrier or for one or more documents having attachment(s) that are stored on a specified data carrier, where a data carrier can be a storage medium, such as a compact disk, or a storage location, such as a server, computer, or the like; (o) workstation application, which enables searching for one or more documents that were generated using a specified workstation application, meaning a computer program or the like; (p) file name, which enables searching for one or more documents by file name; (q) PHIO attributes, which enables searching for one or more documents by physical attribute(s) of object(s) within the documents; (r) LOIO attributes, which enables searching for one or more documents by logical attribute(s) of object(s) within the documents; (s) object links, which enables searching for one or more documents having one or more links to a specified object or document; (t) classification, which enables searching for one or more documents by the classification and properties of object(s) contained within the documents; and (u) folder search, which enables searching for one or more documents within a specified particular folder. Two or more of these search parameters may be combined to extend the set of documents to be searched, as described in more detail below. That is, more than one search statement 102 may be used to define a search.

In FIG. 2, metadata 204 can be stored in different locations. These locations may be searchable, depending on which search parameters are specified. For example, document status can be stored in a separate status log table. In this regard, different tables and databases can be used to store different types of metadata. For example, documents links can be stored in a document link table. Short and long text can be stored in a short text table and a long text table, respectively. Other metadata, such as document type, document number, document version, partial document, deletion tag, CAD tag, professional worker identifier, access group, revision number, and/or lab or design unit can be stored in a single common table or multiple tables. Document classification can be stored in a classification database. Each storage location corresponds to a data "source".

Figure 3:
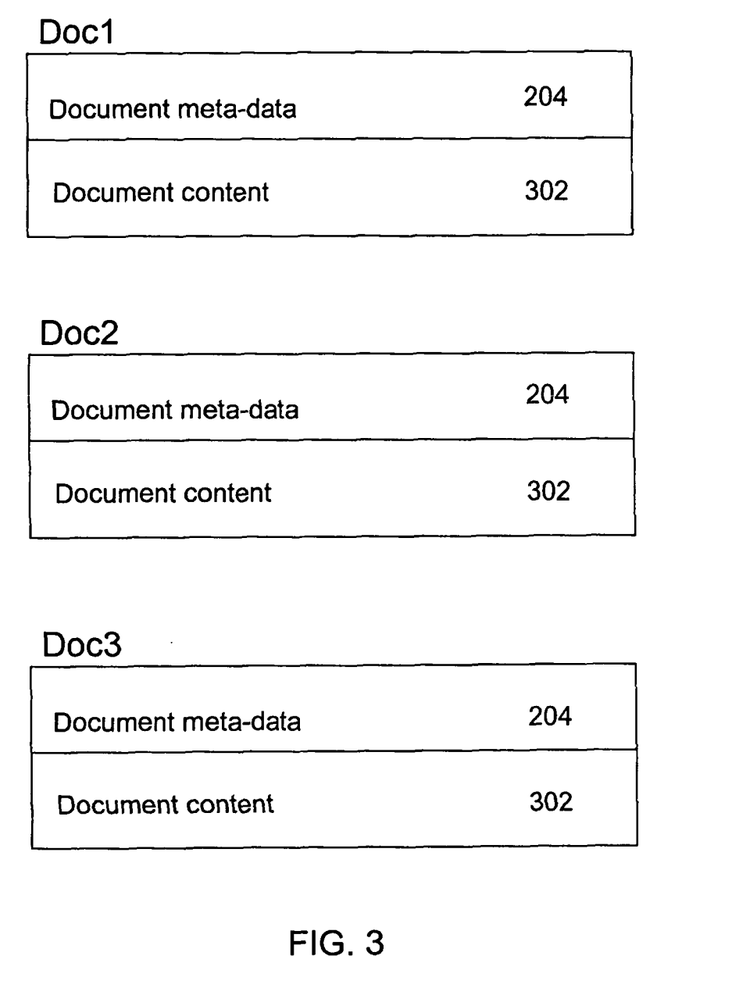
FIG. 3 illustrates different documents having different content and metadata.

FIG. 3 shows three documents, which are labelled Doc1, Doc2, and Doc3. All three documents include metadata 204 and content 302. Metadata 204 can include different information for each document. The information included in metadata 204 can depend on the type of document, as indicated above. The metadata can be stored in different tables, which may, or may not, be part of an attribute database. In this regard, an attribute database can include multiple tables, each of which stores a type of metadata.

Figure 4:
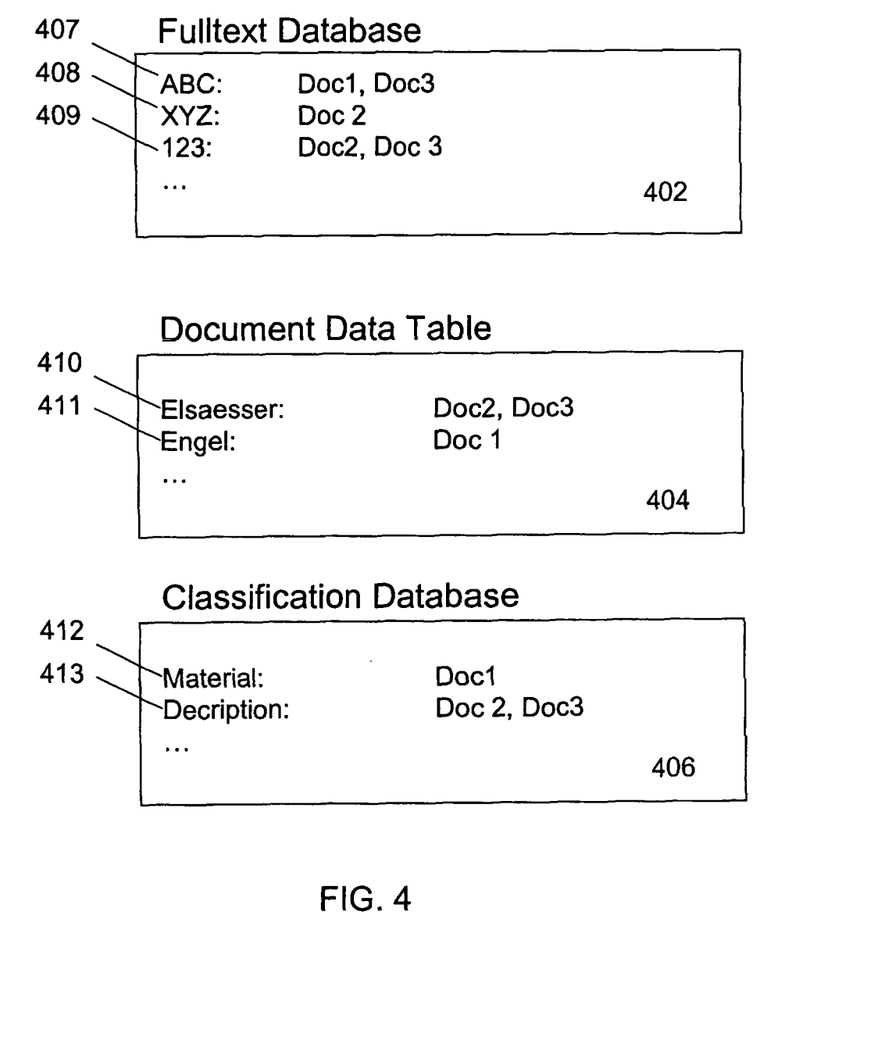
FIG. 4 illustrates an example of a full-text database, a document data table, and a classification database for storing content and metadata of documents.

Document content 302 can also be different for each document. For example, some documents contain primarily text, examples of which include reports, descriptions, and specifications. Document content 302 may be part of a full-text database. The full-text database, together with all other databases for documents Doc1, Doc2, Doc3, can be used as searching sources. FIG. 4 shows databases and tables, which may be searched using a search statement such as search statement 102 of FIG. 1.

FIG. 4 shows a full-text database 402. Full-text database 402 stores content for one or more documents. In this example, full-text database 402 has a first entry 407. Entry 407 refers to Doc1 and Doc3, meaning that the character string "ABC" is in the full-text of documents Doc1 and Doc3. Full-text database 402 also has an entry 408. Entry 408 refers to Doc2, meaning that the character string "XYZ" is in the full-text of document Doc2. Full-text database 402 also has an entry 409. Entry 409 refers to Doc2 and Doc3, meaning that the numerical string "123" is in the full-text of documents Doc2 and Doc3. It is noted that any alphanumeric, or other, string may be used for the search query.

FIG. 4 also shows a document data table 404. Document data table 404 contains metadata relating to documents Doc1, Doc2, and Doc3. In this example, the metadata identifies authors of documents Doc1, Doc2 and Doc 3. For example, "Elsaesser" 410 is referred to in Doc2 and Doc3 because "Elsaesser" is the author of documents Doc2 and Doc3. "Enge1" 411 is referred to in Doc1 because "Enge1" is the author of Doc1.

FIG. 4 also shows a classification database 406. Classification database 406 contains metadata indicating the classifications of documents Doc1, Doc2 and Doc3. In this example, the classifications include material 412 and description 413.

Figure 6:
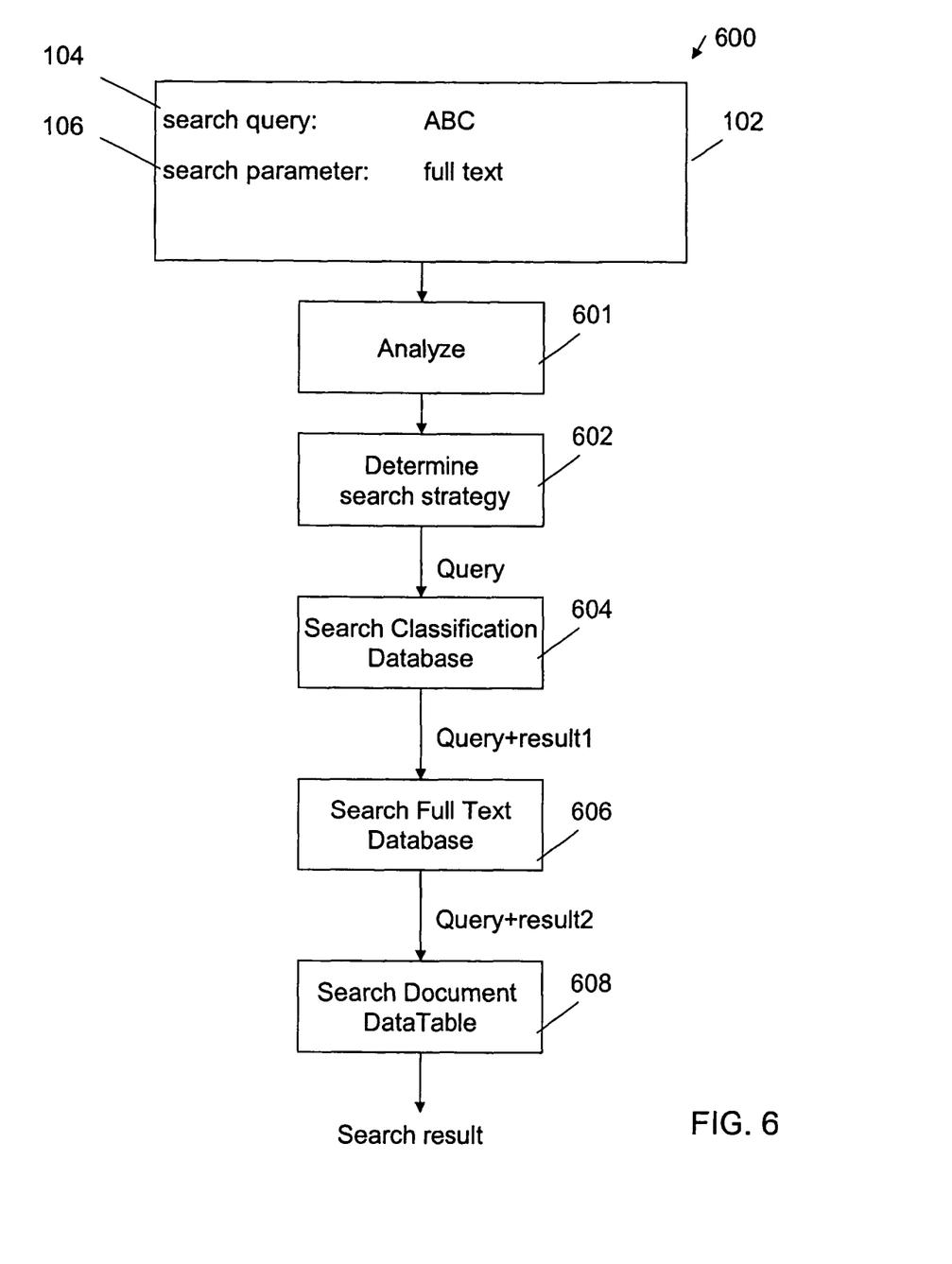
FIG. 6 is a flowchart showing the searching process described herein.

FIG. 6 shows a document searching process 600 that provides advantages over that shown in FIG. 5. In this implementation, searching process 600 is used to search for documents in two or more sources. It is noted, however, that searching process 600 is not so limited, and can be used to search in a single document as well.

Referring to FIG. 6, process 600 receives a search statement 102. Search statement 102 may, or may not, be received from an external system, and may be input by a user. Process 600 analyzes (601) search statement 102. The analysis includes identifying search query 104 and search parameter 106 in search statement 102. Although only one search query and search parameter are shown in FIG. 6, search statement 102 may include multiple search parameters and/or search queries upon which a search is to be based.

In this regard, in a search statement, each search query is associated with one or more search parameters. This indicates which parameters are to be searched using the string in the associated search query. So, in search statement 102, search query 104 is associated with search parameter 106. Thus, the analysis (601) also may include determining association(s) between search parameters and search queries.

Process 600 determines (602) a search strategy based on search query 104 and search parameter 106. That is, search parameter (106) specifies the type of the search, including identifying the source(s) to be searched. Search query 104 contains data to be searched for in the source(s) specified by search parameter 106.

In this implementation, the search strategy can be a dynamic search. A dynamic search defines an order of search activities, which can change dynamically depending upon the content of search statement 102.

In one example, a search activity includes conducting a search in a source specified in search parameter 106. Once the search activities have been identified, the order in which they are carried-out is specified by weighting each search activity based on the parameters and/or queries associated with the search. The searches may be weighted based on the number and/or type of parameters or queries included in the search, and the specificity of those parameters and/or queries. By way of example, a search through a document data table can be conducted for different metadata. Searching in the document table can be initiated in response to different search parameters. If "document type" is one of the search parameters, the search activity associated with searching for a document type is assigned one or more tokens. If an additional search parameter is used, such as "document number", then one or more additional tokens are assigned to the search activity. If only part of the document number or document type is provided one or more tokens can be withdrawn. Similarly, if a "wildcard" search parameter is provided, or a search parameter is truncated with a wildcard (e.g., "*"), one or more tokens can be withdrawn. The sum of all tokens for a search activity constitutes its weight.

As indicated above, the weight of a search activity can also be based on the identity of the parameter used in the search. For example, a larger number of tokens may be assigned to a search activity that includes a full-text search than to a search activity that relates to other search parameter(s). This is because a full-text search involves searching all document data stored in a table. That is, a full-text search is weighted more because it is a more comprehensive search and, thus, is more likely to produce extensive search results than other types of searches.

Weighting may also be based on the length of a search query, as well as the content of the search query. As noted above, if a search query is truncated with a wildcard, one or more tokens may be withdrawn from that search query. If the search query is between four and six characters, one or more token may be assigned to the search query, and if the search query is longer than six characters, still further tokens are assigned. The logic here is that longer search queries are more likely to produce more extensive results.

In some cases, different search activities may be assigned the same weighting. For example, a same type of weighting may be applied for searching based on a document classification as for a full-text search, or the like. The number of tokens assigned or withdrawn for a search activity can be customized, e.g., by a user or another program, in order to affect the search strategy. For example, different computational environments and/or different types of documents may require different weightings to obtain a search strategy that is most effective for the circumstances.

Weighting of search activities enables process 600 to determine which search activities will result in the fewest search results (i.e., "hits"), e.g., the least number of documents matching a particular search query. That is, the search activity with the lowest weighting will likely produce the fewest search results and vice versa. Process 600 can also determine, based on the weightings, which source is likely to provide the fewest search results (since sources are associated with search activities). Process 600 can use the weightings also to determine which search activities or sources will provide the second least number of hits, the third least number of hits, and so on.

The results of a previous search can also be used in a subsequent search, which can improve search efficiency. This is one aspect of dynamic searching, noted above. More specifically, process 600 determines a sequence of search activities (associated with a search statement) based on weighting information for those search activities. The first search activity that is conducted (based on the weighting) may provide a "hit list" with the least number of hits. Subsequent searches may be limited by documents in this hit list. As a result, the amount of searching, and the resulting searching speed, can be reduced.

Referring back to FIG. 4, in one example, search parameters specify searching full-text database 402, document data table 404, and classification database 406. Referring to FIG. 6, process 600 determines (602) a sequence of search activities based on weightings of those activities. For example, classification database 406 may be weighted least; full-text database 402 may be weighted next least, and document data table 404 may be weighted most. Thus, process 600 searches (604) classification database 406, then searches (606) full-text database 402 (606), and then searches (608) document data table 404.

During searching, process 600 sends, to classification database 402, the search query corresponding to the search parameter for searching classification database 402, and conducts a search for document metadata matching the search query. The result of this search, called "result1" includes documents having classification metadata that matches the information in the search query. Process 600 then combines result1 with the search query corresponding to the search parameter for searching full-text database 402. Process 600 then conducts a second search in full-text database 402. The results of this second search, called result2, include documents that were obtained in the first search and that have text (i.e., part of their full-text) that matches the search query. Process 600 then combines result2 with the search query corresponding to the search parameter for searching document data table 404. Process 600 then conducts a third search in document data table 404. The results of this third search include documents that were obtained in the second search and that have information from document data table 404. For example, the search may be for only documents by a particular author, and process 600 may identify only those documents from the second search by that author. Thus, the end result of process 600 includes identification of documents that meet requirements of search statement(s) 102. The final search result may include, e.g., a list of documents that meet the requirements of the search statement, hyperlinks to those documents, and/or short summaries of those documents.

Figure 7:
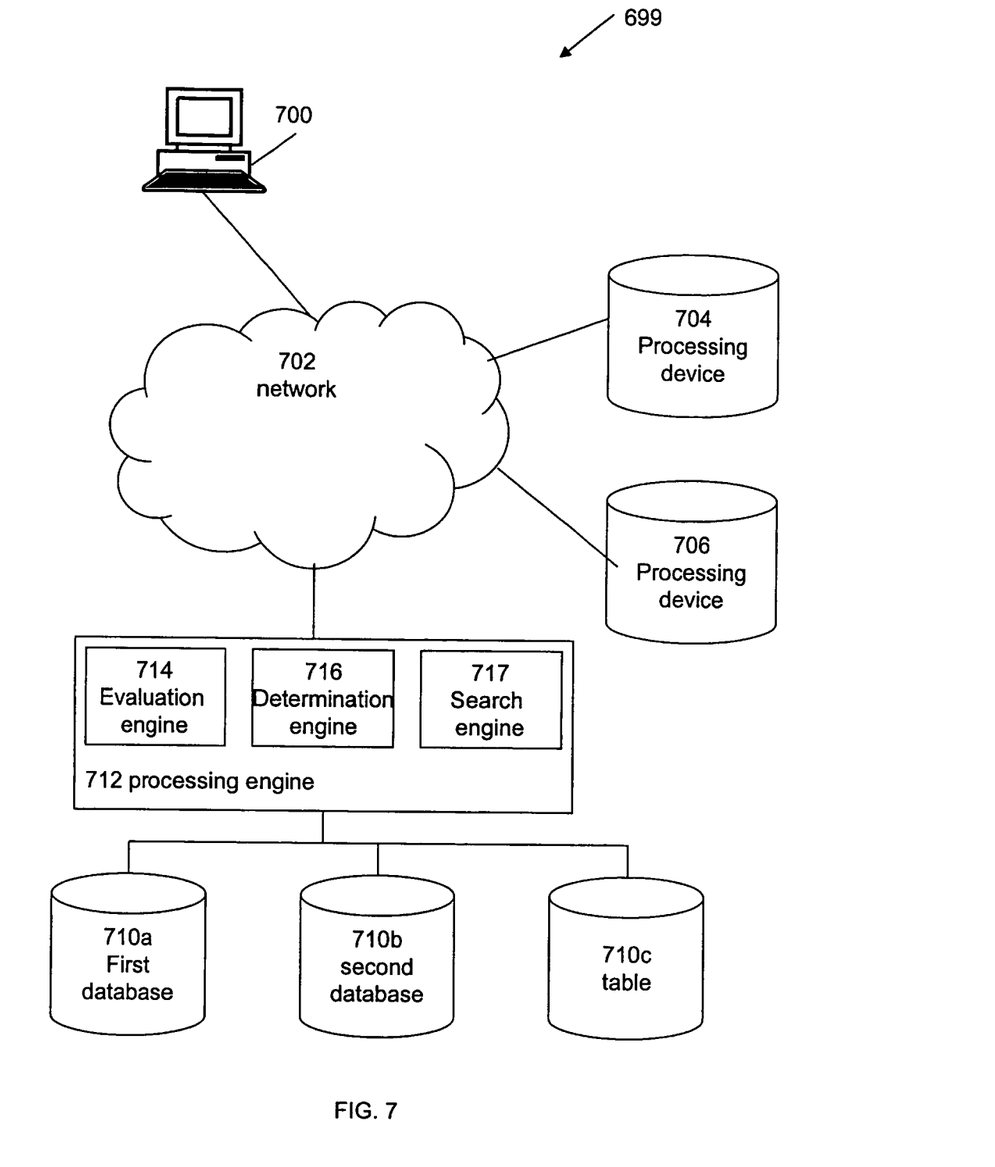
FIG. 7 illustrates a computer system on which the searching process of FIG. 6 may be implemented.
Like reference numerals in different figures indicate like elements.

FIG. 7 illustrates a system 699 that may be used to implement process 600. System 699 includes a processing device 700, such as a computer, for initiating a search. Processing device 700 can be connected with other processing devices 704, 706 and 712 (e.g., computers) via a network 702. Documents may be stored on one or more processing devices 704, 706 and 712 or elsewhere. The documents can be stored in databases and/or tables, such as first database 710a which can be a full-text database, second database 710b which can be a classification database, and table 710c.

In this implementation, processing device 712 includes an evaluation engine 714, a determination engine 716, and a search engine 717. A user inputs, at processing device 700, a search statement containing a search query and search parameters. The search statement is sent via network 702 to processing device 712. Inside processing device 712, the search statement is evaluated in evaluation engine 712 to obtain information upon which a search strategy is based. Using this information, determination engine 714 determines a search strategy. The resulting sources are searched in the order of the search strategy and the results are provided via network 702 to processing device 700.

Process 600 and any modifications thereto described above (referred to collectively as "the searching processes") are not limited to use with the hardware and software described above; they may find applicability in any computing or processing environment and with any type of machine that is capable of running machine-readable instructions. The searching processes can be implemented in digital electronic circuitry, or in computer hardware, firmware, software, or in combinations thereof.

The searching processes can be implemented via a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Actions associated with the searching processes can be performed by one or more programmable processors executing one or more computer programs to perform the functions of the searching processes. The actions can also be performed by, and the searching processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data. Generally, a computer will also include, or be operatively coupled to receive data from, or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM, EEPROM, and flash memory devices; magnetic disks, e.g., internal hard disks or removable disks; magneto-optical disks; and CD-ROM and DVD-ROM disks.

The searching processes can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the searching processes, or any combination of such back-end, middleware, or front-end components. The components of the system can be interconnected by any form or medium of digital data communication, e.g., a communication network. Examples of communication networks include a LAN and a WAN, e.g., the Internet.

Activities associated with the searching processes can be rearranged and/or one or more such steps can be omitted to achieve the same results described herein. All or part of the searching processes may be fully automated, meaning that they operate without user intervention, or interactive, meaning that all or part of the searching processes may include some user intervention.

Elements of different embodiments described herein may be combined to form other embodiments not specifically set forth above. Other embodiments not specifically described herein are also within the scope of the following claims.

What is claimed is:

1. A computer implemented method of searching documents, said computer implemented method comprising:
   receiving a search statement, said search statement comprising at least
   a first search query, said first search query comprising a first search value and at least a first search parameter specifying a first data source to search, and a second search query, said second search query comprising a second search value and at least a second search parameter specifying a second data source to search;

determining a search strategy based on the search statement, the search strategy comprising a search activity for each data source to be searched such that a first search activity and a second search activity for searching said first data source and searching said second data source are created, respectively;

weighting said search activities, said weighting based upon a type of a data source to be searched and a specificity of search value;

searching the first data source and second data source using the first and second search activities respectively, wherein an order in which the first and second search activities are performed is dictated by weightings of the first and second search activities; and returning a final document search result from said search activities.

2. The method as set forth in claim 1, wherein said searching comprises:

performing the first search activity to identify a first result set of documents; and performing the second search activity using the first result set of documents to identify a second result set of documents, said second result set comprising a sub set of said first result set.

3. The method as set forth in claim 2, wherein the search statement further comprises a third search query, said third search query comprising a third search value and at least a third search parameter specifying a third data source to search and wherein the method further comprises:

performing a third search activity for searching said third search value in said third data source, the third search activity being part of the search strategy, the third search activity using the second result set of documents to identify a third result set of documents, said third result set comprising a sub set of said second result set.

4. The method as set forth in claim 1, wherein said first search activity receives a greater weighting than said second search activity if said first search data source is a full-text data source and said second search data source is not a full-text data source.

5. The method as set forth in claim 1, wherein a search activity having a first search value with a long string receives a greater weighting than said search activity having a second search value with a short string.

6. The method as set forth in claim 1, wherein at least one of the first data source and second data source comprises at least one of a table and a database.

7. The method as set forth in claim 1, wherein a search activity having a search value with a wildcard receives lower weighting than said search activity having a search value without a wildcard.

8. The method as set forth in claim 1, wherein the documents are stored in different locations that are accessible over a network.

9. A computer program product, the computer program product comprising a set of instructions in a machine-readable storage device for use in searching for documents, said documents having searchable parameters, said searchable parameters stored in more than one different data sources, the set of instructions for causing at least one machine to:

receive a search statement, said search statement comprising at least a first search query, said first search query comprising a first search value and at least a first search parameter specifying a first data source to search, and a second search query, said second search query comprising a second search value and at least a second search parameter specifying a second data source to search;

determine a search strategy based on the search statement, the search strategy comprising a search activity for each data source to be searched such that a first search activity and a second search activity for searching said first data source and searching said second data source are created, respectively;

assign weights to said search activities, said weights based upon a type of a data source to be searched and a specificity of search value;

search the first data source and second data source using the first and second search activities respectively, wherein an order in which the first and second search activities are performed is dictated by the weights assigned to the first and second search activities; and returning a final document search result from said search activities.

10. The computer program product as set forth in claim 9, wherein searching comprises:

performing the first search activity to identify a first result set of documents; and performing the second search activity using the first result set of documents to identify a second result set of documents, said second result set comprising a sub set of said first result set.

11. The computer program product as set forth in claim 10, wherein the search statement further comprises a third search query, said third search query comprising a third search value and at least a third search parameter specifying a third data source to search and wherein the computer program product further comprises instructions for causing the at least one machine to:

perform a third search activity for searching a third data source, the third search activity being part of the search strategy, the third search activity using the second result set of documents to identify a third result set of documents, said third result set comprising a sub set of said second result set.

12. The computer program product as set forth in claim 10, wherein said first search activity receives a greater weight than said second search activity if said first search data source is a full-text data source and said second search data source is not a full-text data source.

13. The computer program product as set forth in claim 9, wherein a search activity having a first search value with a long string receives a greater weight than said search activity having a second search value with a short string.

14. The computer program product as set forth in claim 9, wherein at least one of the first data source and second data source comprises at least one of a table and a database.

15. The computer program product as set forth in claim 9, wherein a search activity having a first search value with a wildcard receives lower weighting than said search activity having a second search value without a wildcard.

16. The computer program product as set forth in claim 9, wherein the documents are stored in different locations that are accessible over a network.

17. A storage system, said storage system comprising:

storage locations to store two or more documents; and a processing device that executes instructions to search documents, said documents having searchable parameters, said searchable parameters stored in more than one different data sources, the processing device for executing instructions to:

receive a search statement, said search statement comprising at least
- a first search query, said first search query comprising a first search value and at least a first search parameter specifying a first data source to search, and
- a second search query, said second search query comprising a second search value and at least a second search parameter specifying a second data source to search;

determine a search strategy based on the search statement, the search strategy comprising a search activity for each data source to be searched such that a search activity and a second search activity for searching said first data source and searching said second data source are created, respectively;

assign weights to said search activities, said weights based upon a type of a data source to be searched and a specificity of search value;

search the first data source and second data source using the first and second search activities respectively, wherein an order in which the first and second search activities are performed is dictated by the weights assigned to the first and second search activities; and returning a final document search result from said search activities.

18. The system as set forth in claim 17, wherein the instructions implement an input engine, an evaluation engine, a determination engine, and a search engine.

* * * * *